Figure 1:
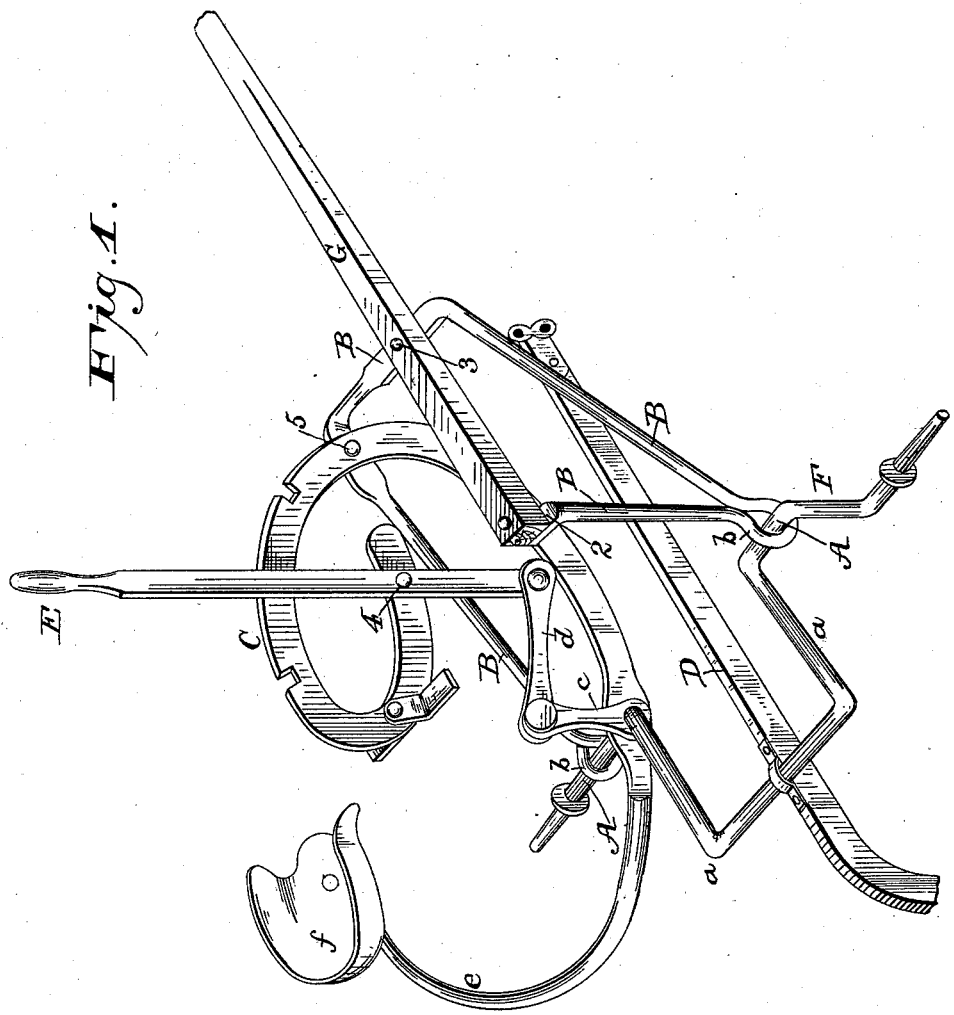

(No Model.) 2 Sheets—Sheet 1.

G. W. AKINS & J. T. NELSON.
SULKY PLOW.

No. 302,184. Patented July 15, 1884.

Witnesses:
Burnham
A. J. Willard

Inventors.
George W. Akins.
John T. Nelson.
By A. S. Bell
Atty.

(No Model.) 2 Sheets—Sheet 2.

G. W. AKINS & J. T. NELSON.
SULKY PLOW.

No. 302,184. Patented July 15, 1884.

Witnesses:
F. H. Burnham
A. J. Willard

Inventors:
George W. Akins.
John T. Nelson.
By A. Pell
Atty.

UNITED STATES PATENT OFFICE.

GEORGE W. AKINS AND JOHN T. NELSON, OF NASHVILLE, ILLINOIS.

SULKY-PLOW.

SPECIFICATION forming part of Letters Patent No. 302,184, dated July 15, 1884.

Application filed March 24, 1884. (No model.)

*To all whom it may concern:*

Be it known that we, GEORGE W. AKINS and JOHN T. NELSON, citizens of the United States, residing at Nashville, county of Washington, and State of Illinois, have invented a new and useful Improvement in Sulky-Plows, of which the following is a specification.

Our invention relates to an improvement in the axle and frame of a sulky-plow, as shown in the accompanying drawings, and hereinafter described.

In the drawings, like figures and letters refer to like parts.

Figure 3:
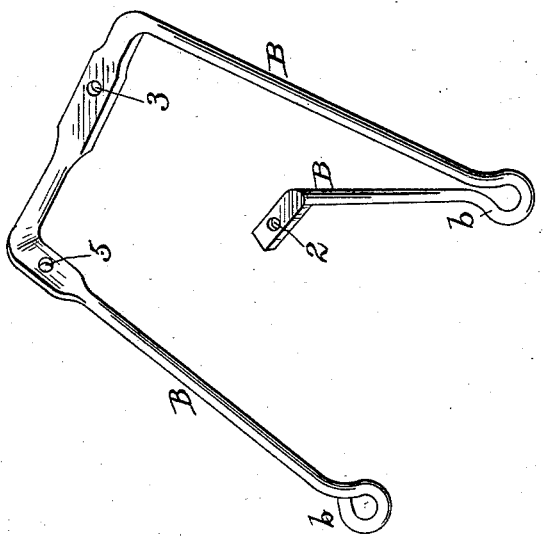
Figure 2:
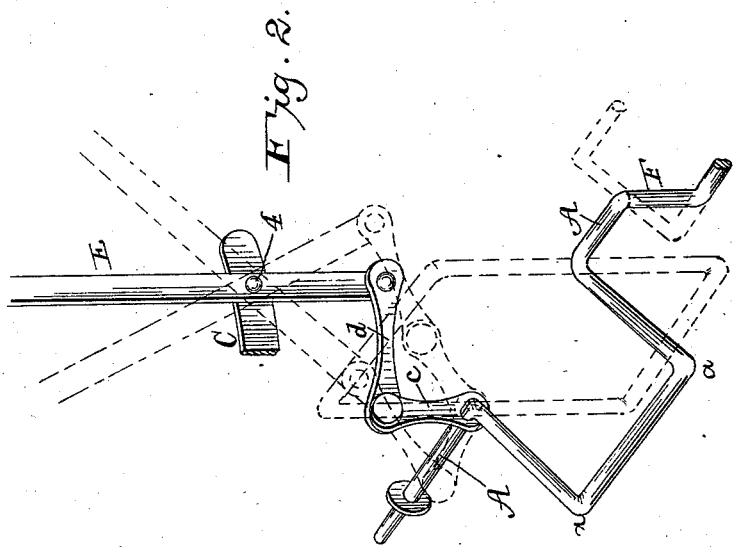

Figure 1 represents a perspective elevation of the improved sulky-plow with the wheels off. Fig. 2 represents a perspective view of the axle-bar, showing in dotted lines the highest elevation of the double crank and crank-axle and their lowest depression. Fig. 3 represents the frame of the sulky-plow.

A is the continuous axle-bar, $a$ the double crank, and F the crank-axle, said continuous axle-bar being journaled on the frame B at $b$ $b$. The crank-axle is formed upon the axle-bar at right angles with the plane of the double crank, or at such angle as will bring the wheels upon the same plane when the plow is lifted for transportation or depressed to its lowest point for striking a furrow. When the plow is in position for ordinary plowing, the crank-axle gives the required depression to the furrow-wheel. The axle-bar A, carrying double crank and crank-axle, is rotated by means of the hand-lever E, fulcrumed on the segmental rack-bar C at 4. This lever is connected with a lever-arm, $c$, rigidly attached to double crank $a$ by means of link-lever $d$. When the lever is drawn toward the driver's seat $f$, the double crank is lifted, and when pressed in the contrary direction lowered. The frame B is constructed of a single rod or bar, the axle-bar journals being formed therein, as shown in Fig. 3. The pole G and the rack-bar C are rigidly connected with the frame at 2 and 5 by means of bolts or rivets. The rack-bar is supported by the axle, the latter passing through said bar, and is held in position by two collars fitting upon the axle-bar—one upon each side of the rack-bar. The seat-standard being made part of the rack-bar, the requisite support is thus given it by the connections above described. The plow-beam D is secured to the double crank by any approved means.

It is evident that the invention described by us may be used upon a right or left handed plow, the position of the crank-axle upon the axle-bar determining the furrow side of the plow.

What we claim as new and of our invention, and for which we desire Letters Patent of the United States, is—

1. In combination with the wheels and frame of a sulky-plow, a continuous axle-bar having double crank $a$ thereon, a crank-wheel spindle on furrow side of said axle-bar, lever-arm $c$, rigidly attached to said double crank, plow-beam D, and lever E, whereby through suitable mechanism the plow is lifted and lowered and the frame maintained in a level position without increased resistance of the weight of the seat and driver, substantially as set forth.

2. In a sulky-plow, the continuous axle-bar with double crank and crank-axle, and suitable means for rotating it, in combination with rod-frame B, said frame journaled upon the axle-bar and connecting together rigidly the pole, rack-bar, hand-lever, and seat-standard, substantially as set forth.

3. In a sulky-plow, the combination of continuous axle-bar A, double crank $a$, journals $b$ $b$, crank-axle F, frame B, rack-bar C, seat-standard $e$, hand-lever E, rigid lever-arm $c$, link-lever $d$, and plow-beam D, arranged and combined substantially as and for the purpose set forth.

In testimony whereof we have hereunto set our hands and seals in the presence of two subscribing witnesses.

GEORGE W. AKINS. [L. S.]
JOHN T. NELSON. [L. S.]

Witnesses:
JAMES M. ROUNTREE,
S. T. MCKELDEN.